United States Patent
Joch et al.

(10) Patent No.: US 7,050,504 B2
(45) Date of Patent: May 23, 2006

(54) LOW-COMPLEXITY DEBLOCKING FILTER

(75) Inventors: Anthony Joch, Vancouver (CA); James Au, Port Coquitlam (CA); Yu-sheng Brandon Lin, Richmond (CA)

(73) Assignee: UB Video, Inc., Vancouver (CA)

( * ) Notice: Subject to any disclaimer, the term of this patent is extended or adjusted under 35 U.S.C. 154(b) by 242 days.

(21) Appl. No.: 10/310,059

(22) Filed: Dec. 5, 2002

(65) Prior Publication Data

US 2004/0101059 A1 May 27, 2004

Related U.S. Application Data

(62) Division of application No. 10/300,849, filed on Nov. 21, 2002.

(51) Int. Cl.
*H04N 7/18* (2006.01)

(52) U.S. Cl. .............................. 375/240.26; 375/240.21

(58) Field of Classification Search ................................ 375/240.01–240.29
See application file for complete search history.

(56) References Cited

U.S. PATENT DOCUMENTS

| | | | | |
|---|---|---|---|---|
| 5,422,964 A | * | 6/1995 | Devimeux et al. | 382/226 |
| 5,428,395 A | * | 6/1995 | Jeong | 375/240.14 |
| 5,590,064 A | * | 12/1996 | Astle | 708/203 |
| 5,608,652 A | * | 3/1997 | Astle | 708/203 |
| 6,539,060 B1 | * | 3/2003 | Lee et al. | 375/240.29 |
| 6,823,089 B1 | * | 11/2004 | Yu et al. | 382/268 |
| 2002/0118399 A1 | * | 8/2002 | Estevez et al. | 358/426.07 |

* cited by examiner

*Primary Examiner*—Andy Rao
(74) *Attorney, Agent, or Firm*—McCarthy Tetrault LLP

(57) ABSTRACT

A method of filtering to remove coding artifacts introduced at block edges in a block-based video coder, the method having the steps of: checking the content activity on every line of samples belonging to a boundary to be filtered and where content activity is based on a set of adaptively selected thresholds determined using Variable-Shift Table Indexing (VSTI); determining whether the filtering process will modify the sample values on that particular line based on said content activity, and selecting a filtering mode between at least two filtering modes to apply on a block boundary basis, implying that there would be no switching between the two primary modes on a line by line basis along a given block boundary. The two filtering modes include a default mode based on a non-recursive filter, and a strong filtering mode which features two strong filtering sub-modes and a new selection criterion that is one-sided with respect to the block boundary to determine which of the two strong filtering sub-modes to use. The two strong filtering sub-modes include a new 3-tap filter sub-mode and a 5-tap filter sub-mode that permits a more efficient implementation of the filter.

6 Claims, 8 Drawing Sheets

LOW-COMPLEXITY DEBLOCKING FILTER (This is a Divisional of U.S. patent application Ser. No. 10/300,849 filed on Nov. 21, 2002.)

FIELD OF THE INVENTION

The present invention relates to the field of video coding, more particularly it relates to a method of reducing blocking artifacts inherent in hybrid block-based video coding.

BACKGROUND OF THE INVENTION

Video compression is used in many current and emerging products. It has found applications in video-conferencing, video streaming, serial storage media, high definition television (HDTV), and broadcast television. These applications benefit from video compression in the fact that they may require less storage space for archived video information, less bandwidth for the transmission of the video information from one point to another, or a combination of both.

Over the years, several standards for video compression have emerged, such as the Telecommunication Standardization Sector of the International Telecommunication Union (ITU-T) recommended video-coding standards: H.261, H.262, H.263 and the emerging H.264 standard and the International Standardization Organization and International Electrotechnical Commission (ISO/IEC) recommended standards MPEG-1, MPEG-2 and MPEG-4. These standards allow interoperability between systems designed by different manufacturers.

Video is composed of a stream of individual pictures (or frames) made up of discrete areas known as picture elements or pixels. The pixels are organised into lines for display on a CRT or the like. Each pixel is represented as a set of values corresponding to the intensity levels of the luminance and chrominance components of a particular area of the picture. Compression is based mainly on the recognition that much of the information in one frame is present in the next frame and, therefore, by providing a signal based on the changes from frame to frame a much reduced bandwidth is required. For the purpose of efficient coding of video, the pictures or frames can be partitioned into individual blocks of 16 by 16 luminance pixels called "macroblocks". This practice simplifies the processing which needs to be done at each stage of the algorithm by an encoder or decoded. To encode a macroblock (or sub-macroblock partition) using motion-compensated prediction, an estimation is made of the amount of motion that is present in the block relative to the decoded pixel data in one or more reference frames, usually recently decoded frames, and the appropriate manner in which to convey the information from which the current frame may be reconstructed. The residual signal, which is the difference between the original pixel data for the macroblock and its prediction, is spatially transformed and the resulting transform coefficients are quantized before being entropy coded. The basic processing blocks of an encoder are a motion estimator/compensator/predictor, a transform, a quantizer and an entropy coder. Due to the quantization of the transformed coefficients of the residual signal, the reconstructed pixel values are generally not identical to those of the original frame. Since the coding is block-based, the errors that are introduced by the quantization process tend to produce artifacts in the form of sharp transitions in image intensity across transform block boundaries in the reconstructed frame. Such artifacts are referred to as "blocking artifacts". The appearance of blocking significantly affects the natural smoothness seen in video images and leads to a degradation of the overall video image quality.

Blocking artifacts are inherent in hybrid block-based video coders, especially in low bit rate video applications. A number of solutions have been presented to alleviate the degradation in visual quality due to the presence of blocking artifacts. Two general approaches have been proposed to deal with blocking artifacts. The first approach is based on using a deblocking filter in the decoder only as a post-processing stage, and applying the deblocking filter on the decoded and reconstructed video frames before they are displayed. The purpose of the filter is to modify the sample values around the block boundaries in order to smooth unnatural sharp transitions that have been introduced by the block-based coding process. Having a deblocking filter applied outside of the motion-compensation loop can be viewed as an optional process for the decoder, placing no requirements on the video encoder. However, this scheme has a disadvantage in that the reference frames that are used for generating predictions for the coding of subsequent frames will contain blocking artifacts. This can lead to reduced coding efficiency and degraded visual quality. The second approach to reduce the visibility of blocking artifacts is to apply a deblocking filter inside the motion-compensation loop. In this case, the reference frames that are used for generating predictions for subsequent encoded frames represent filtered reconstructed frames, generally providing improved predictions and improved compression and visual quality. In order to create identical predictions at both the encoder and decoder, the deblocking filter (sometimes referred to as a "loop filter" if it is inside the motion-compensation loop) must be applied in both the encoder and the decoder.

In order to reduce the appearance of blocking artifacts, a number of video coding standards, including H.263 version 2, and most recently the emerging H.264 video coding standard specify the use of a deblocking filter inside the motion-compensation loop. In particular, the H.264 video coding standard fully specifies a deblocking filter that is to be used inside the motion-compensation loop in both the encoder and decoder.

One of the known prior art methods is described in a document "Working Draft Number 2, Revision 2 (WD-2)" by the Joint Video Team (JVT) of ISO/IEC MPEG and ITU-T VCEG. In this prior art method, filtering occurs on the edges of 4×4 blocks in both the luminance and chrominance components of each reconstructed video frame. The filtering takes place on one 16×16 macroblock at a time, with macroblocks processed in raster-scan order throughout the frame. Within each macroblock, vertical edges are filtered first from left to right, followed by filtering of the horizontal edges, from top to bottom. The filtering of samples for one line-based filtering operation occurs along the boundary separating unfiltered samples $p_0$, $p_1$, $p_2$, and $p_3$ on one side of the boundary, and unfiltered samples $q_0$, $q_1$, $q_2$, and $q_3$ on the other side, as illustrated in FIG. 3a. The block boundary lies between samples $p_0$ and $q_0$. In some cases $p_1$, $p_2$ may indicate samples that have been modified by filtering of a previous block edge. For each line-based filtering operation, unfiltered samples will be referred to with lower-case letters, and filtered samples with upper-case letters. For each block boundary segment (consisting of 4 rows or columns of samples), a "Boundary strength" parameter, referred to as "Bs", is computed before filtering. The calculation of Bs is based on parameters that are used in encoding the bounding blocks of each segment. Each segment is assigned a Bs value from zero to four, with a value of zero indicating that no filtering will take place, and a value of 4 indicating that the strongest filtering mode will be used.

The process for determining Bs is as follows. For each boundary, a determination is made as to whether either one of the two blocks that neighbour the boundary is intra-coded. If either block is intra-coded, then a further determination is made as to whether the block boundary is also a macroblock boundary. If the block boundary is also a macroblock boundary, then Bs=4, else Bs=3.

Otherwise, if neither block is intra-coded then a further determination is made as to whether either block contains non-zero transform coefficients. If either block contains non-zero coefficients then Bs=2; otherwise if a prediction of the two blocks is formed using different reference frames or a different number of frames and if a pair of motion vectors from the two blocks reference the same frame and either component of this pair has a difference of more than one sample, then Bs=1; else Bs=0, in which case no filtering is performed on this boundary. The value of boundary strength, Bs, for a specific block boundary is determined by the encoding characteristics of the two 4×4 blocks along the boundary. Therefore, the control of the filtering process for each individual block boundary is well localized. The block boundary is filtered only when it is necessary, based on whether the coding modes used for the neighbouring blocks are likely to produce a visible blocking artifact.

The known filtering process starts with the step of filtering each 4×4 block edge in a reconstructed macroblock. The filtering "Boundary strength" parameter, Bs, is computed and assigned based on the coding parameters used for luma. Block boundaries of chroma blocks correspond to block boundaries of luma blocks, therefore, the corresponding Bs for luma is also used for chroma boundaries.

Filtering takes place in the order described above on all boundary segments with non-zero value for Bs. The following describes the process that takes place for each line-based filtering operation.

A content activity check is performed. If the check is passed, filtering continues; otherwise, the sample values are not modified on this line of the boundary segment. The activity check makes use of a pair of activity threshold parameters, ALPHA ($\alpha$) and BETA ($\beta$), whose particular values are selected from the above Table 1, based on the average quantization parameter ($QP_{av}$) used in coding each boundary segment. It is noted that $QP_{av}$ represents the average value of the quantization parameter values used in encoding the two blocks that neighbour the boundary, with rounding of the average by truncation of any fractional part. Accordingly, the content activity check is passed if $|p_0-q_0|<$ALPHA ($\alpha$) AND $|p_1-p_0|<$BETA ($\beta$) AND $|q_1-q_0|<$BETA ($\beta$).

Further, if this first content activity check is passed, and Bs is not equal to 4, default mode filtering is performed. Otherwise, if the check is passed and Bs is equal to 4, a second, stricter activity check is performed. This activity check involves the evaluation of the condition $1<|p_0-q_0|<(QP_{av}>>2)$ AND $|p_2-p_0|<$BETA ($\beta$) AND $|q_2-q_0|<$BETA ($\beta$).

If this second condition is true on a particular line of samples, a strong mode filtering is used on this line of samples. Otherwise, a default mode filtering is used on this line of samples. It should be noted the symbol ">>" is used to represent the operation of bit-wise shifting to the right.

Among the disadvantages of the above described known method is that it permits switching between two filtering modes with very different characteristics at the level of each line of samples within a boundary segment. This switching adds complexity to the filtering process and can significantly increase the worst-case critical path for processing on many architectures.

Further disadvantages include the particular values in the tables of filtering parameters, ALPHA ($\alpha$) and BETA ($\beta$), which are not optimized to produce the best subjective viewing quality of reconstructed and filtered video. Further, the characteristics of the deblocking filter in terms of the threshold parameters used in the activity checks and equations used for generating filtered sample values are fixed in the known method, providing the encoder with little or no flexibility to control the properties of the deblocking filter.

TABLE 1

$QP_{av}$ dependent activity threshold parameters $\alpha$ and $\beta$

| $QP_{av}$ | 0 | 1 | 2 | 3 | 4 | 5 | 6 | 7 | 8 | 9 | 10 | 11 | 12 | 13 | 14 | 15 | 16 | 17 | 18 | 19 |
|---|---|---|---|---|---|---|---|---|---|---|---|---|---|---|---|---|---|---|---|---|
| $\alpha$ | 0 | 0 | 0 | 0 | 0 | 0 | 0 | 0 | 0 | 0 | 0 | 0 | 0 | 0 | 0 | 0 | 0 | 0 | 0 | 0 |
| $\beta$ | 0 | 0 | 0 | 0 | 0 | 0 | 0 | 0 | 0 | 0 | 0 | 0 | 0 | 0 | 0 | 0 | 0 | 0 | 0 | 0 |

| $QP_{av}$ | 20 | 21 | 22 | 23 | 24 | 25 | 26 | 27 | 28 | 29 | 30 | 31 | 32 | 33 | 34 | 35 | 36 | 37 | 38 | 39 |
|---|---|---|---|---|---|---|---|---|---|---|---|---|---|---|---|---|---|---|---|---|
| $\alpha$ | 4 | 4 | 5 | 6 | 7 | 9 | 10 | 12 | 14 | 17 | 20 | 24 | 28 | 33 | 39 | 46 | 55 | 65 | 76 | 90 |
| $\beta$ | 3 | 3 | 3 | 4 | 4 | 4 | 6 | 6 | 7 | 7 | 8 | 8 | 9 | 9 | 10 | 10 | 11 | 11 | 12 | 12 |

| $QP_{av}$ | 40 | 41 | 42 | 43 | 44 | 45 | 46 | 47 | 48 | 49 | 50 | 51 |
|---|---|---|---|---|---|---|---|---|---|---|---|---|
| $\alpha$ | 106 | 126 | 148 | 175 | 207 | 245 | 255 | 255 | 255 | 255 | 255 | 255 |
| $\beta$ | 13 | 13 | 14 | 14 | 15 | 15 | 16 | 16 | 17 | 17 | 18 | 18 |

This hinders optimization of the subjective quality of the decoded video for different types of video content and displays.

In the default mode of the above identified filtering method, the value Δ, which represents the change from the unfiltered values of $p_0$ and $q_0$ to their respective filtered values is computed using:

$$\Delta = \text{Clip}(-C, C, (((q_0-p_0)<<2+(p_1-q_1)+4)>>3)),$$

where C is determined as specified below and the function "Clip" is defined as:
  Clip(a, b, c)=IF (c<a) THEN a
    ELSE IF (c>b) THEN b
    ELSE c Further, the filtered values $P_0$ and $Q_0$ are computed where $$P_0 = \text{Clip}(0, 255, p_0+\Delta) \text{ and } Q_0 = \text{Clip}(0, 255, q_0-\Delta).$$

In order to compute the clipping value, C, that is used to determine Δ, and also determine whether the values of $p_1$ and $q_1$ will be modified on this set of samples, two intermediate variables, $a_p$ and $a_q$ are computed, where:

$$\alpha_p = |p_2-p_0| \text{ and } \alpha_q = |q_2-q_0|.$$

If $\alpha_p < \beta$ for a luminance edge, a filtered sample $P_1$ is produced as specified by: $P_1 = p_1 + \text{Clip}(-C0, C0, (p_2+P_0-(p_1<<1))>>1)$.

If $a_q < \beta$ for a luminance edge, a filtered sample $Q_1$ is produced as specified by $Q_1 = q_1 + \text{Clip}(-C0, C0, (q_2+Q_0-(q_1<<1))>>1)$ where C0 is specified in Table 2 (see based on Bs and $QP_{av}$ for the block boundary. For both luma and chroma, C is determined by setting it equal to C0 and then incrementing it by one if $a_p < \beta$, and again by one if $a_q < \beta$.

parameter that is used to clip the value of Δ. These computations could be avoided by specifying a simpler method to compute C for chroma filtering.

For strong mode filtering in the known method, the following equations are applied to calculate the filtered sample values:

$$P_0 = (p_2 + 2*p_1 + 2*p_0 + 2*q_0 + q_1 + 4) >> 3,$$

$$P_1 = (p_3 + 2*p_2 + 2*p_1 + 2*p_0 + q_0 + 4) >> 3,$$

$$Q_0 = (p_1 + 2*p_0 + 2*q_0 + 2*q_1 + q_2 + 4) >> 3 \text{ and}$$

$$Q_1 = (p_0 + 2*q_0 + 2*q_1 + 2*q_2 + q_3 + 4) >> 3.$$

For the luminance component only, $p_2$ and $q_2$ are also filtered as specified by:

$$P_2 = (2*p_3 + 3*p_2 + p_1 + p_0 + q_0 + 4) >> 3 \text{ and}$$

$$Q_2 = (2*q_3 + 3*q_2 + q_1 + q_0 + p_0 + 4) >> 3.$$

Filtering with this set of equations can lead to insufficient reduction in the visibility of blocking artifacts It is therefore an object of the present invention to obviate or mitigate the above-mentioned disadvantages.

SUMMARY OF THE INVENTION

In accordance with one aspect of the present invention there is provided a method of filtering samples to minimise coding artifacts introduced at a block boundary in a block-based video encoder, the method having the steps of:
  (a) calculating a pair of indices used to access a table of a pair of corresponding activity threshold values, the indices calculated using an average quantization parameter and an offset parameter;

TABLE 2

Value of filter clipping parameter C0 as a function of $QP_{av}$ and Bs

| | $QP_{av}$ | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Bs = 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| Bs = 2 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 |
| Bs = 3 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 | 1 |

| | $QP_{av}$ | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| Bs = 1 | 1 | 1 | 1 | 1 | 1 | 1 | 1 | 2 | 2 | 2 | 3 | 3 | 3 | 4 | 4 | 4 | 5 | 6 | 6 | 7 | 8 | 9 | 10 | 11 | 13 |
| Bs = 2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| Bs = 3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 |

It is important to note that the computation of the filtered values $P_1$ and $Q_1$ require as an input to the filtering equation the filtered values of $P_0$ and $Q_0$ from the current line of samples. This recursive filtering method presents a disadvantage as the values of $P_0$ and $Q_0$ must be computed before the computation of $P_1$ and $Q_1$ can begin. This design can impede parallel processing of the different samples and thereby increases the critical path for the default mode filtering on most hardware architectures.

An additional disadvantage in the default mode filtering process of the known method is that the calculation of the clipping parameter, C, for chroma samples is unnecessarily complex. The chroma samples $p_1$ and $q_1$ are never filtered in the default mode and, therefore, the computation of the variables $a_p$ and $a_q$ is only necessary to determine the C (b) determining the activity threshold values based on the pair of indicies;
  (c) confirming whether the filtering process will modify the sample values on every line of samples for the block boundary by checking a content activity for the every line of samples for the block boundary, the content activity based on the determined activity threshold values; and
  (d) filtering the confirmed samples when a block on either side of the block boundary was coded using inter prediction.

The determination of whether the filtering process will modify the sample values on each particular line is based on a content activity check which makes use of a set of adaptively selected thresholds whose values are determined using Variable-Shift Table Indexing (VSTI). The method is also operated on a system including tables for the various activity thresholds accessed through the calculated indicies.

In another aspect of the invention there is provided a method of controlling filter properties to adjust the properties of said filter at a block boundary, the method having the steps of:

(a) computing an average quantization parameter value ($QP_{av}$) at the block boundary;

(b) adding offset values Filter_Offset_A and Filter_Offset_B to the average quantization parameter value $QP_{av}$ and clipping these values within a given range to determine table indices $Index_A$ and $Index_B$; and (c) accessing an ALPHA (α) table, a BETA (β) table, and a Clipping (C0) table using the indices computed based on the filter offsets and the average quantization parameter value such that:
ALPHA=ALPHA_TABLE[$Index_A$]
BETA=BETA_TABLE [$Index_B$]
C0=CLIP_TABLE[Bs][$Index_A$]

In a still further aspect of the invention there is provided a method of filtering samples to minimise coding artifacts introduced at a block boundary in a block-based video encoder, the method having the steps of checking content activity on every line of samples belonging to the boundary to be filtered and determining whether the filtering process will modify the sample values on said line of samples based on content activity thresholds that are dependent on a quantization parameter and determined using a filter offset parameter.

BRIEF DESCRIPTION OF THE DRAWINGS

These and other features of the preferred embodiments of the invention will become more apparent in the following detailed description in which reference is made to the appended drawings wherein.

DESCRIPTION OF THE PREFERRED EMBODIMENTS

Figure 1:
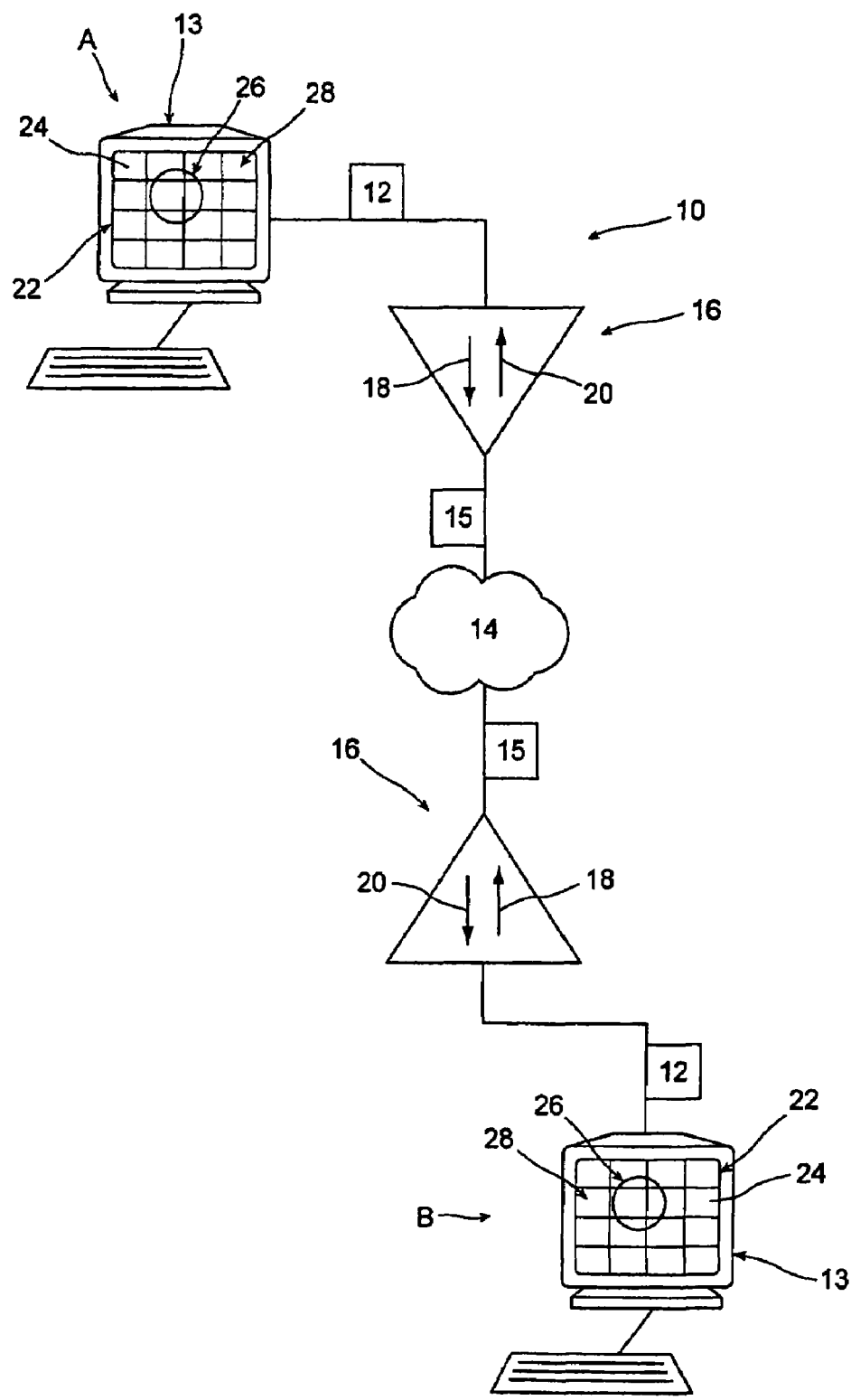
FIG. 1 is a schematic representation of a data transmission system.

Referring to FIG. 1, a video conferencing system 10 used as an example of a video transmission system has participants A and B that exchange video data 12 between monitors 13, formatted as a compressed bit stream 15 over a network 14 (such as but not limited to the Internet). Each participant A, B has a video processor 16 having an encoder 18 for encoding transmitted video data 12 and a decoder 20 for decoding the received bit stream 15. Each image frame 22 displayed on the monitors 13 is made of a series of macroblocks 24, such as but not limited to a block of 16×16 pixels, representing (for example) an object 26 which moves over a background 28 (for example a person giving a presentation while standing in front of a backdrop). Accordingly, the processors 16 coordinate the display of successive frames 22 on the monitors 13, as the video data 12 is communicated between the participants A, B, which can include applications such as video conferencing. It will be appreciated recognised that the system 10 may also involve the exchange of video data 12 in the compressed bit stream 15 in either one direction or both and on peer-to-peer basis or broadcast.

The video data 12 is a temporal sequence of pictures, each referred to as a frame or field 22. Each picture 22 is organized as a matrix of macroblocks 24. Each macroblock 24 has a size of 16 by 16 pixels and the macroblocks 24 are stored from left to right and from top to bottom and groups of macroblocks 24 are combined in a slice 32 (see FIG. 2). Generally, a slice 32 contains macroblocks 24 and each macroblock 24 consists of blocks 25 (see FIG. 3). Generally, each macroblock 24 is composed of three images; one red (R), one green (G), and one blue (B). However, for compatibility with non-coloured media, the RGB model is represented as an equivalent YCbCr model, where Y is a luminance (luma) component, and Cb and Cr are chrominance (chroma) components, such that typically $Y=0.299R+0.587G+0.114B$, $Cb=B-Y$, and $Cr=R-Y$. Therefore, each frame 22 of the video data 12 is generically referred to as containing one luma image, one Cb chroma image, and one Cr chroma image. Standard formats have 8 bits per pixel to digitally represent each of the three components, where Cb and Cr images are typically downsampled by 2 in each dimension due to the sensitivity of human vision. Generally, each block 25 consists of four pixels for the luma components and one pixel for each chroma component of the 4:2:0 color data. The blocks 25 are processed and compressed for transmission as the bit stream 15 over the network 14 (see FIG. 1).

Generally, one of three fundamental coding modes can be selected for each macroblock 24, with the choice of coding mode determining how the prediction of a macroblock 24 is formed. Intra-coded (I) macroblocks 24 make use of intra-prediction, in which the prediction is formed using only the current picture. In predictive (P), or inter-coded, macroblocks 24 the prediction of each sample is formed by referring to one block 25 in the set of previously decoded and stored reference pictures 22. In bi-predictive (B) macroblocks 24, predictions can be formed in this way, but can also be formed by computing a weighted average of two different blocks 25 in the set of previously decoded reference pictures 22. It will be noted that some of the previously decoded pictures 22 are typically temporally subsequent to the current picture in terms of their intended display order when bi-predictive coding is used. Depending on the mode of each slice 32, which is indicated in the slice header 27, P- and B-macroblocks 24 may not be permitted within certain slices 32.

Referring again to FIG. 2, the bitstream 15 is organized into a hierarchy of syntax levels, with the 3 main levels being a sequence level 17, a picture (or frame) level 19, and slice level 21. A concept know as "parameter sets" allows efficient transmission of infrequently changing data at the sequence 17 and picture level 19 in the H.264 standard. A sequence parameter set 29 in the first level 17 includes values of parameters that will remain unchanged for an entire video sequence, or from one instantaneous decoder refresh (IDR) picture to the next. (IDR pictures are used to provide points of random access into the bitstream).

Examples of parameters in a sequence parameter set 29 include frame dimensions and the maximum number of reference frames. A unique ID number "N" identifies each sequence parameter set 29.

A picture parameter set 31 in the second level 21 includes values of parameters that will remain unchanged within a coded representation of a picture (frame or field) 22. Examples of parameters in the picture parameter set 31 include the entropy coding mode and a flag that specifies whether deblocking filter parameters will be transmitted in the slice headers 27 of the picture 22 (see FIG. 1). Each picture parameter set 31, labeled as "M", refers to the unique ID of a valid sequence parameter set 29, which selects the active sequence parameters that are used when decoding coded pictures 22 that use the particular picture parameter set 31. The unique ID number "M" identifies each picture parameter set 31.

A slice 32 in the bit stream 15 contains a picture data 35 representing a sub-set of the macroblocks 24 of the complete picture 22. The macroblocks 24 in a slice 32 are ordered contiguously in raster scan order. The coded slice 32 includes the slice header 27 and the slice data 35 (coded macroblocks 24). The slice header 27 contains a coded representation of data elements 35 that pertain to the decoding of the slice data that follow the slice header 27. One of these data elements contains a reference to a valid picture parameter set 31, which specifies the picture parameter values (and indirectly the sequence parameter values) to be used when decoding the slice data 35. Each slice header 27 within the same picture 22 must refer to the same picture parameter set 31. Other data elements in the slice header 27 include the initial quantization parameter for the first macroblock 24 in the slice 32 and deblocking filter offset parameters 39 (as further explained below), if the transmission of such offset parameters 39 is specified in the active picture parameter set.

Thus, the filter offsets 39 are transmitted in the slice header 27, and therefore the offsets 39 can be different for each slice 32 within the picture 22. However, depending on the value of a flag in the picture parameter set 31 ("filter_parameters_flag"), the transmission of these offsets 39 in the slice header 27 might be disabled. In the case that offsets 39 are not transmitted, a default value of zero is used for both filter offsets 39 for example. Further, each picture parameter set 31 contains parameter values that pertain to the decoding of the pictures 22 for which the particular parameter set 31 is active (i.e. selected in the slice headers 27 of the picture 22). The parameter sets 31 also contain a reference to the sequence parameter sets 29, which are active for decoding of the pictures 22. The choice of sequence parameter sets 29 and picture parameter sets 31 can be chosen by the encoder 18 (see FIG. 1), or set at the time of system 10 setup for sequential operation of the encoder 18, decoder 20 pair.

Figure 2:
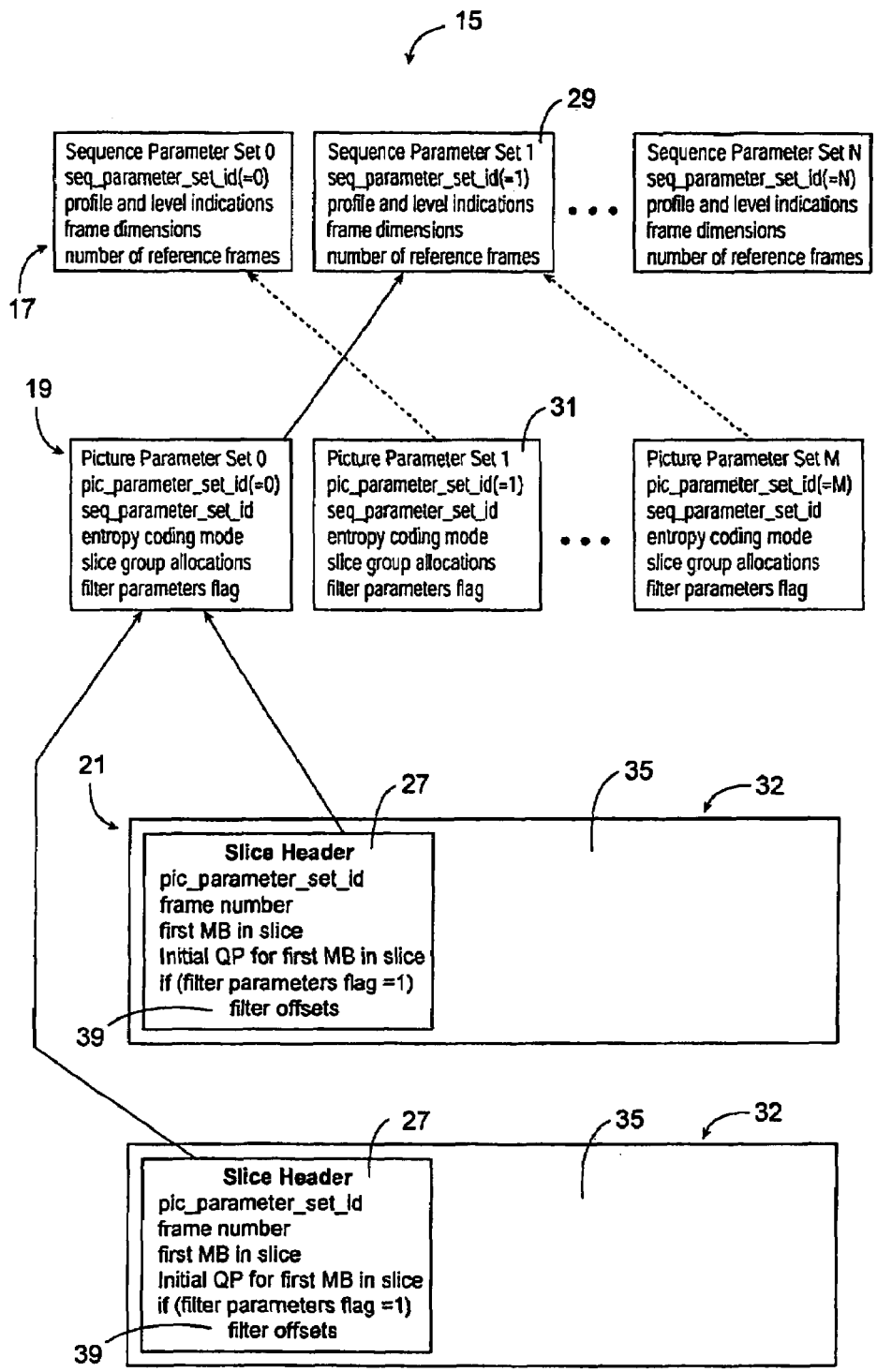
FIG. 2 is a schematic representation of hierarchy of levels of an H.264 conformant bitstream.
Figure 3A:
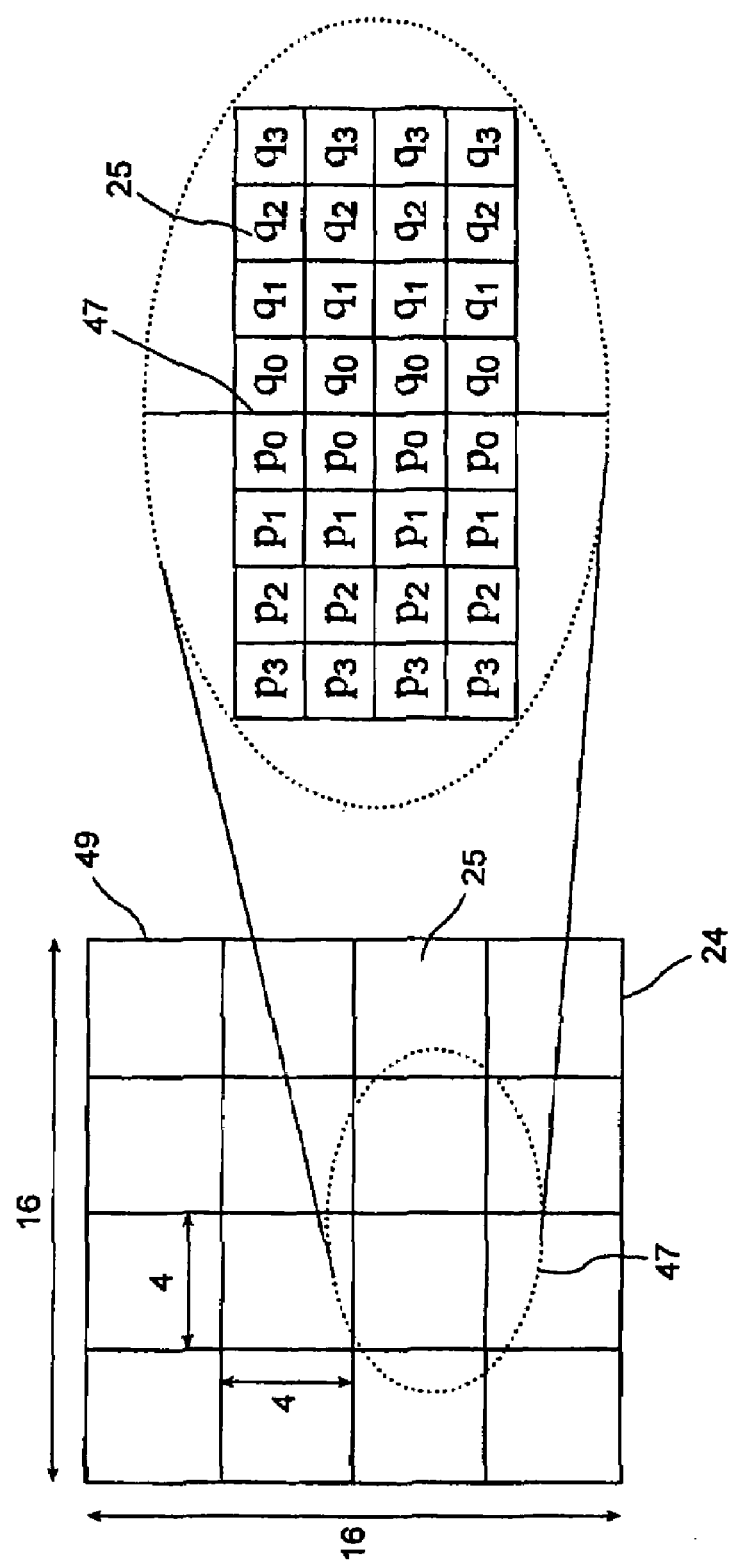
FIG. 3a is schematic representation of a macroblock and a block.

Referring further to FIG. 2, each of the pictures 22 can select individual picture parameter sets that specify the picture structure and the picture coding type. For exemplary purposes only, FIG. 3a contains the macroblock 24 each consisting of a grouping of pixels, such as a 16×16 luma block 25 with the two associated 8×8 chroma blocks 25. However, it is recognized that other sizes of blocks 24 could be used to represent the frames 22, if desired. Each slice 32 of the frame 22 is encoded by the encoder 18 (see FIG. 1), independently from the other slices 32 in the frame 22. Each of the slices 32 has the slice header 27 that provides information, such as but not limited to the position of the respective slice 32 in the frame 22 as well as the initial quantization parameter; and the slice data which provides information for reconstructing the macroblocks 24 of a slice 32, such as but not limited to the prediction modes and quantised coefficients for each of the respective macroblocks 24.

Figure 4:
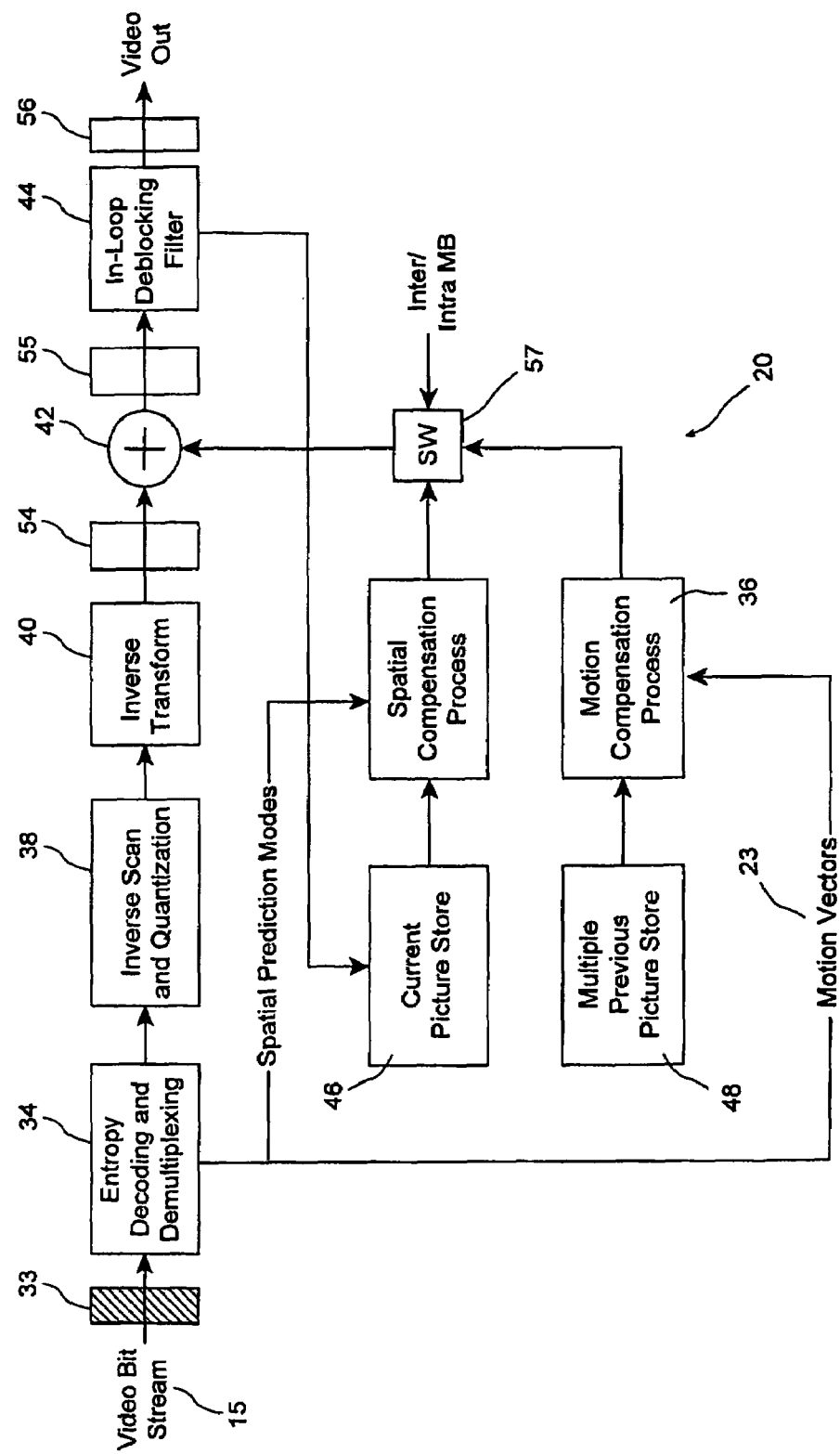
FIG. 4 is a block diagram of a hybrid block-based video decoder including a deblocking filter inside the motion compensation loop of the system of FIG. 1.

Referring to FIG. 4, the decoder 20 processes the received bit stream 15 and then reconstructs the predicted frame 46, using a stored copy of the reference frame(s) 48, the transmitted motion vectors 23, and the decompressed or reassembled prediction error 54 contained in the bit stream 15.

The bit stream 15 generated by the encoder 18 is processed by the decoder 20 to produce the reconstructed video images 55. Referring to FIG. 4, the video decoder 20 is based on functional units or components similar to those found in other hybrid block-based video decoders. The functional units include a buffering unit 33 that receives the compressed bitstream 15, an entropy decoder 34 which decodes the received bit stream 15 to produce syntax elements used in subsequent processing by the other decoder 20 components, a motion compensated prediction 36 to produce the predicted frame, an inverse scanning and quantization unit 38, and inverse transform units 40 to reproduce the coded prediction error 54. A reconstruction unit 42 adds the prediction error 54 to the predicted pixels 57 to produce the reconstructed frame 56, and a deblocking filter 44 that smoothes the edges of sub-blocks within the reconstructed frame 56 to produce the filtered reconstructed frame 56. Each of the above mentioned components is discussed in more detail in the following.

The incoming video bitstream 15 is stored in a buffer 33 at the input to the decoder 20. The first stage in the decoding process includes the parsing and decoding of the entropy coded bitstream symbols that are stored in a buffer 46 to produce the syntax elements used by the other decoder 20 components.

The various syntax elements in the bitstream 15 are de-multiplexed for use in different processes within the decoder 20. High-level syntax elements include temporal information for each frame, frame coding types and frame dimensions. The coding can be based primarily on macroblocks 24 consisting of 16×16 luminance-pixel blocks 25 and 2 8×8 chrominance pixel blocks 25. On the macroblock 24 level, syntax elements include the coding mode of the macroblock 24, information required for forming the prediction, such as motion vectors 23 and spatial prediction modes, and the coded information of the residual (difference) blocks, such as the coded block pattern (CBP) for each macroblock 24 and quantized transform coefficients for each of the underlying blocks 24.

Depending on the coding mode of each macroblock 24, the predicted macroblock 24 can be generated either temporally (inter prediction) or spatially (intra prediction). The prediction for an inter-coded macroblock 24 is specified by the motion vectors 23 that are associated with that macroblock 24. The motion vectors 23 indicate the position within the set of previously decoded frames from which each block of pixels will be predicted. Each inter-coded macroblock 24 can be partitioned in a number of different ways, using blocks of seven different sizes, with luminance block sizes ranging from 16×16 pixels to 4×4 pixels. Also, a special SKIP mode exists in which no motion vector difference values 23 (or coded residual blocks) are transmitted and the prediction is taken from a location in the previous picture that is predicted by the values of previously decoded motion vectors 23 of macroblocks 24 neighbouring the current macroblock 24. Thus, 0 to 16 motion vectors 23 can be transmitted for each inter-coded macroblock 24. Additional predictive modes in which two different motion vectors 23 correspond to each pixel and the sample values are computed using a weighted average are supported when bi-predictive macroblock types are employed.

For each motion vector 23, a predicted block 25 must be computed by the decoder 20 and then arranged with other blocks 24 to form the predicted macroblock 24. Motion vectors 23 in H.264 are specified generally with quarter-pixel accuracy. Interpolation of the reference video frames is necessary to determine the predicted macroblock 24 using sub-pixel accurate motion vectors 23.

Multiple (previous for P-pictures) reference pictures 22 can also be used for motion-compensated prediction. Selection of a particular reference pictures 22 is made on an 8×8 sub-macroblock 24 basis, or larger if a larger sub-macroblock partition size is used for generating the motion-compensated prediction. This feature can improve coding efficiency by providing a larger set of options from which to generate a prediction signal.

Two different modes are supported in intra prediction and coding of macroblocks 24. In the 4×4 Intra mode, each 4×4 block within a macroblock 24 can use a different prediction mode. In the 16×16 Intra mode, a single prediction mode is used for the entire macroblock 24. The prediction of intra-coded blocks 25 is always based on neighboring pixel values that have already been decoded and reconstructed.

The decoding of a residual (difference) macroblock 24 requires that a number of transforms be performed on any blocks for which non-zero transform coefficients were transmitted in the bitstream, along with associated scanning and coefficient scaling operations. The transforms that are required for each macroblock 24 are determined based on the coding mode and the coded block pattern (CBP) of the macroblock 24. The decoding of a difference macroblock 24 is based primarily on the transformation of 4×4 blocks 25 of both the luminance and chrominance pixels, although in some circumstances, a second-level transform must be performed on the DC coefficients of a group of 4×4 blocks 25 for macroblocks 24 that are coded in the 16×16 Intra prediction mode. Additionally, a special 2×2 transform is applied to the 4 DC coefficients of the chrominance residual blocks 25 of a macroblock 24.

The values of the quantized coefficients are parsed and decoded by the entropy decoder 34. These are put into their correct order based on the run values through the scanning process and then the levels, which represent quantized transform coefficients, are scaled via multiplication by a scaling factor. Finally, the necessary transform to reconstruct the coded residual signal for a block is performed on the scaled coefficients. The result of the transforms for each macroblock 24 is added to the predicted macroblock 24 and stored in the reconstructed frame buffer 48.

In the final stage of the decoding process, the decoder 20 applies the normative deblocking filtering process, which reduces blocking artifacts that are introduced by the coding process. The filter 44 is applied within the motion compensation loop, so both the encoder 18 and decoder 20 must perform this filtering. The filtering is performed on the 4×4 block edges of both luminance and chrominance components. The type of filter 44 used, the length of the filter and its strength are dependent on several coding parameters as well as picture content on both sides of each edge. A stronger filtering mode is used if the edge lies on a macroblock boundary 49 where the block on one or both sides of the edge is coded using intra prediction. The length of the filtering is also determined by the sample values over the edge, which determine the so-called "activity measures". These activity measures determine whether 0, 1, or 2 samples on either side of the edge are modified by the filter.

Figure 5:
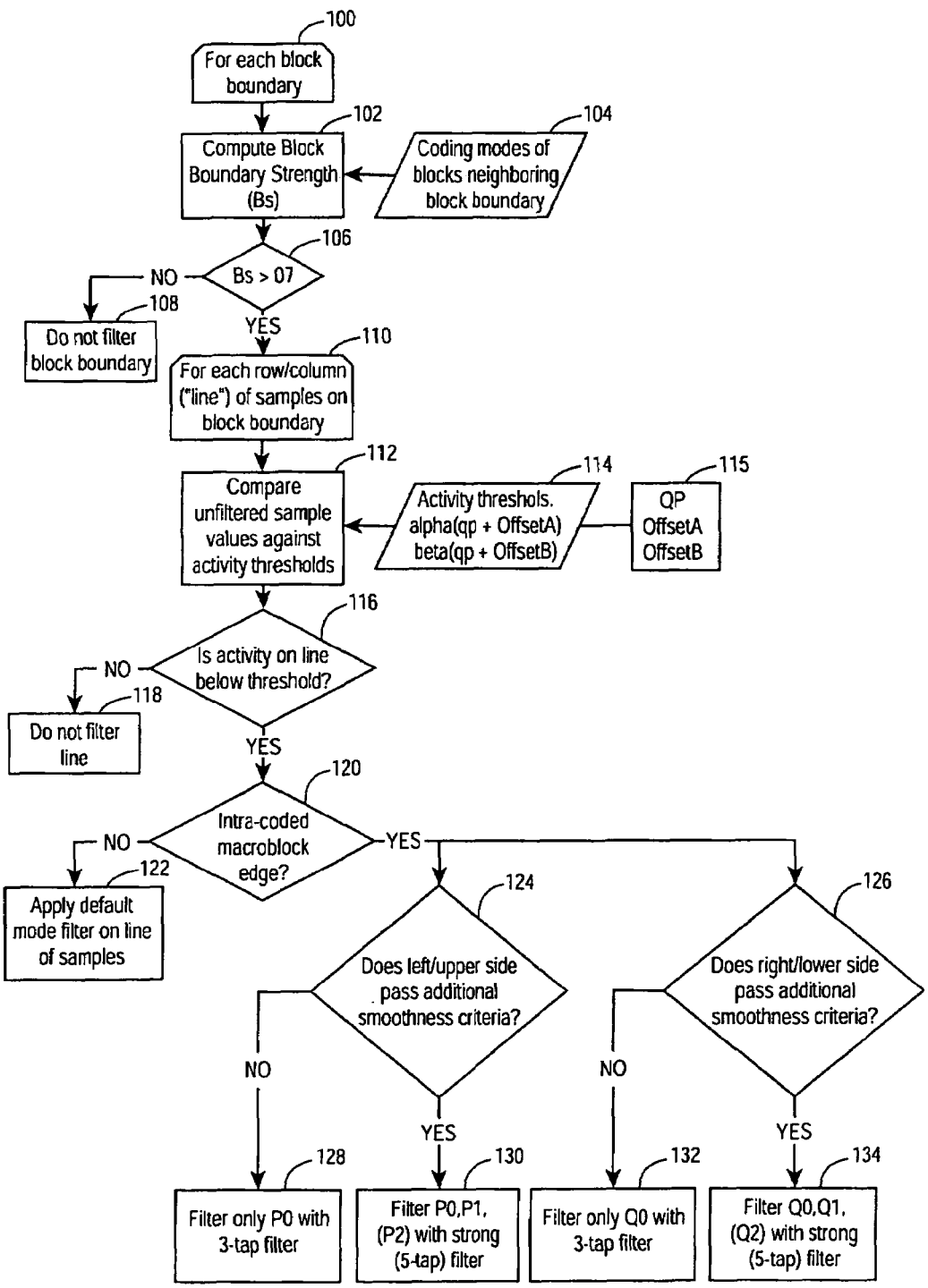
FIG. 5 is a flowchart of the operation of the deblocking filter process for the decoder of FIG. 4.

Filtering is applied across the 4×4 block edges of both luminance and chrominance components. Looking at FIG. 3a, the blocks 25 are separated by boundaries or block edges 47, with unfiltered samples $p_0$, $p_1$, $p_2$ and $p_3$ on one side of the boundary 47 and unfiltered samples $q_0$, $q_1$, $q_2$ and $q_3$ on the other side, such that the boundary 47 lies between $p_0$ and $q_0$. In some cases $p_1$, $p_2$ may indicate samples that have been modified by filtering of the previous block edge 47. The deblocking filter 44 (see FIG. 4) is applied on the block boundaries 47 of each reconstructed frame 56, which helps to reduce the visibility of coding artifacts that can be introduced at those block boundaries 49. The filter 44 includes a control function that determines the appropriate filtering to apply. The control algorithm is illustrated by FIG. 5.

Figure 7:
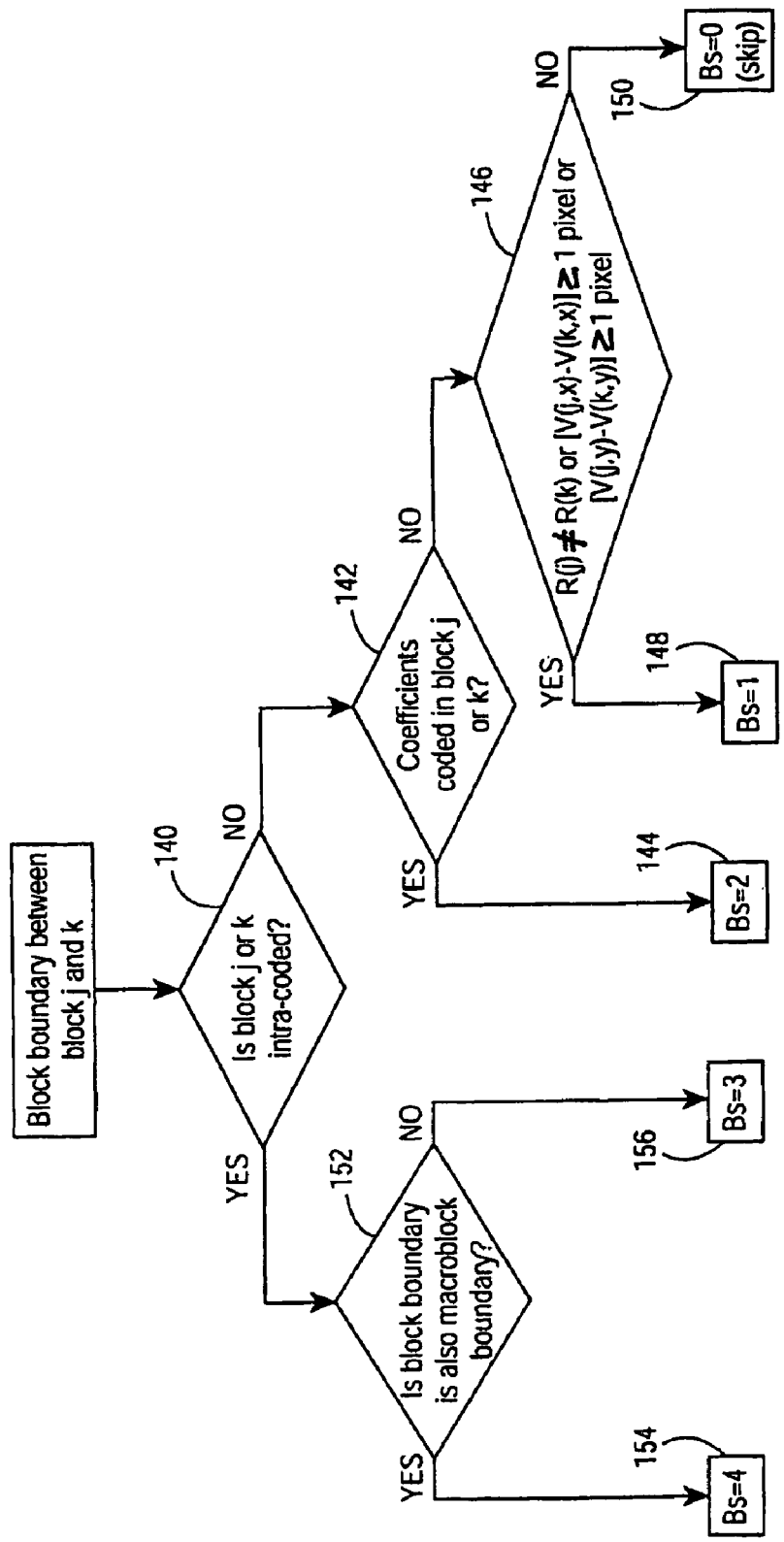
FIG. 7 is flowchart for the process of calculating the boundary strength for the decoder of FIG. 4.

One of the parameters used to control the filtering process of all the block boundaries 47 is the boundary strength, Bs. The procedure for determining the boundary strength, Bs, for the block boundary 47 between two neighbouring blocks j and k is illustrated in FIG. 7. For TI each edge 47, a determination is made as to whether either one of the two blocks j and k across the boundary 47 is intra-coded, in step 140. If either block j or k is intra-coded then a further determination is made as to whether the block boundary 47 is also a macroblock boundary 49, in step 152. If the block boundary 47 is also a macroblock boundary 49, then Bs=4 (step 154), else Bs=3 (step 156).

Otherwise, if neither block j or k is intra-coded then a further determination is made as to whether either block 25 contains non-zero coefficients, in step 142. If either block 25 contains non-zero coefficients then Bs=2 (step 144), otherwise the following condition is applied:

$R(j) \neq R(k)$ or $|V(j, x) - V(k, x)| \geq 1$ pixel or $|V(j, y) - V(k, y)| > 1$ pixel, where R(j) is the reference picture 22 used for predicting block j, and V(j) is the motion vector 23 used for predicting block j, consisting of x and y (horizontal and vertical) components. Therefore, if a prediction of the two blocks 25 is formed using different reference frames 22 or a different number of frames 22 or if a pair of motion vectors 23 from the two blocks 25 reference the same frame and either component of this pair has a difference if more than one sample distance, then this condition holds true and Bs=1 (step 148);

else,

Bs=0 (step 150), in which case no filtering is performed.

The value of boundary strength, Bs, for a specific block boundary 47 is determined solely by characteristics of the two 4×4 blocks 24 across the boundary 47. Therefore, the control of the filtering process for each individual block boundary 47 is well localized. A block boundary 47 is filtered only when it is necessary, so that unneeded computation and blurring can be effectively avoided.

The flowchart of FIG. 5 describes the filtering process starting with step 100 for the purposes of filtering each 4×4 block edge 47 in a reconstructed macroblock 24. The filtering "Boundary strength" parameter, Bs, is computed (102) and assigned for luma. Block boundaries 47 of chroma blocks 25 always correspond to block boundaries 47 of luma blocks 25, therefore, the corresponding Bs for luma is also used for chroma boundaries 47. The boundary strength is based on the parameters that are used in encoding the bounding blocks 25 of each segment (104). Each segment is assigned a Bs value from 0 to 4, with a value of zero indicating that no filtering will take place (108), and a value of 4 indicating that the strongest filtering mode will be used.

Figure 3B:
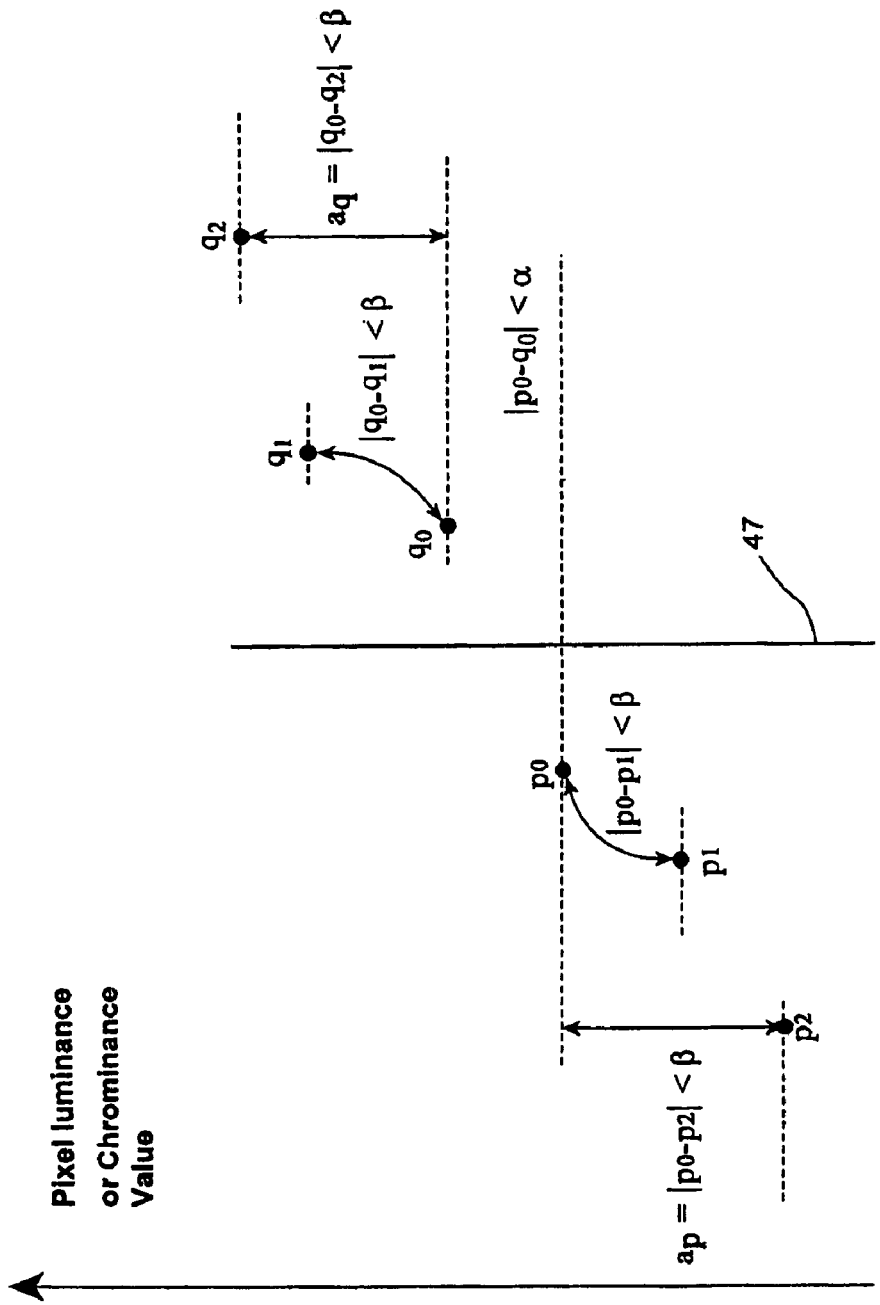
FIG. 3b is a diagram showing relationship between unfiltered samples and activity thresholds.

In step 110, the filtering process takes place for each line of samples on the block boundary 47. The set of filtering operations that take place on one line of a block boundary is referred to as a line-based filtering operation. A content activity check at the boundary 47 between the two blocks 25 is performed in step 112. The content activity measure is derived from the absolute value of the separation between sample values of $p_0$, $p_1$, $q_0$, $q_1$ on either side of the boundary 47. The activity check is based on two activity threshold parameters ALPHA ($\alpha$) and BETA ($\beta$), whose particular values are selected based on the average quantization parameter ($QP_{av}$) used in coding each boundary segment, as well as upon a pair of encoder 18 selected parameter values, referred to as Filter_Offset_A and Filter_Offset_B (referred to as 39 in FIG. 2). $QP_{av}$ represents the average of the quantization parameter values used in coding the two blocks 25 that neighbour the boundary 47, with rounding of the average by truncation of any fractional part. Thus, the content activity check is done by comparing difference in the unfiltered sample values $p_0$ and $q_0$ across the boundary 47 against the activity threshold ALPHA ($\alpha$), and the difference in the unfiltered sample values $p_0$ and $p_1$ on one side of the boundary 47 and unfiltered sample values $q_0$ and $q_1$ on the other side of the boundary 47 against the activity threshold and BETA ($\beta$), as shown in FIG. 3b. A determination is made to discover whether the activity on the line is above or below the activity threshold. If the activity is above the threshold, the sample values are not modified, otherwise filtering continues. The ALPHA ($\alpha$) and BETA ($\beta$) values are considered as activity thresholds for the difference in magnitude between sample values along the line of samples being filtered.

Referring to FIG. 3, the ALPHA ($\alpha$) and BETA ($\beta$) parameters represent the activity thresholds for the difference in the values of unfiltered samples $p_0$, $p_1$, $q_0$, $q_1$ across the boundary 47. The content activity check is passed if $|p_0-q_0|<$ALPHA ($\alpha$) AND $|p_1-p_0|<$BETA ($\beta$) AND $|q_1-q_0|<$BETA ($\beta$)

The sets of samples $p_0$, $p_1$, $q_0$, $q_1$ across this edge 46 are only filtered if Bs is not equal to zero and the content activity check expressed in the above condition is passed.

The values in the ALPHA ($\alpha$)- and BETA ($\beta$)-tables used in the loop filter are optimal in terms of the resulting video visual quality and allow some flexibility in the encoder 18 in terms of adjusting the filter parameters, such as the activity threshold parameters and maximum change in a sample value produced by the default filter, through control of the indexing of these tables. The strength of the deblocking filter 44 refers to the magnitude of the change in sample intensities that is caused by the filtering process. Generally, the strength of the filter 44 varies with the coding mode, as well as the step-size used for quantization of the transform coefficients. Stronger filtering is applied when the quantization step-size (and its corresponding "quantization parameter", QP) are larger, since it is more likely that large block artifacts are created when the quantization is coarse. Thus, flexibility in the properties of the loop filter 44 is provided by allowing the encoder 18 to select offsets 39 to the QP-based indices used to address these tables. This adds flexibility to the filter 44, help making it more robust to different content, resolutions, display types, and other encoder 18 decision characteristics.

The $\alpha$- and $\beta$-tables of the loop filter 44 are QP-dependent thresholds that define the maximum amount of activity at an edge for which the edge will still be filtered. The modified $\alpha$-table of the preferred embodiment is based on the subjective evaluation of a number of sequences over the entire QP scale. In the preferred embodiment, the value of $\alpha$ doubles every 6 QP as it is related directly to the quantization step size, which also doubles every 6 QP in the H.264 standard.

A determination is made to find the QP value below which $\alpha$ should be zero, such that the filter is no longer used for values of ax which equal zero. Looking at Table 1, in sequences with smooth areas, blocking artifacts are clearly visible using QP=19, which is the largest QP for which $\alpha$ is equal to zero. Based on Table 3, filtering will take place for QP values as low as 16, since blocking artifacts are still visible in smooth areas. The $\beta$-table is also extended at the low QP end in order to permit filtering at these lower QP values.

The content activity check (112) determines whether each sample line is to be filtered and uses the following specific values for $\alpha$ and $\beta$ (114) as shown in Table 3 below, where the index used to access the tables is clipped to be within the range of valid QP values (0 to 51).

TABLE 3

| Index$_A$ (for $\alpha$) or Index$_B$ (for $\beta$) | | | | | | | | | | | | | | | | | | |
|---|---|---|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 | 16 | 17 | 18 |
| $\alpha$ 0 | 0 | 0 | 0 | 0 | 0 | 0 | 0 | 0 | 0 | 0 | 0 | 0 | 0 | 0 | 0 | 4 | 4 | 5 |
| $\beta$ 0 | 0 | 0 | 0 | 0 | 0 | 0 | 0 | 0 | 0 | 0 | 0 | 0 | 0 | 0 | 0 | 2 | 2 | 2 |

| Index$_A$ (for $\alpha$) or Index$_B$ (for $\beta$) | | | | | | | | | | | | | | | | | | |
|---|---|---|---|---|---|---|---|---|---|---|---|---|---|---|---|---|---|---|
| 19 | 20 | 21 | 22 | 23 | 24 | 25 | 26 | 27 | 28 | 29 | 30 | 31 | 32 | 33 | 34 | 35 | 36 | 37 |
| $\alpha$ 6 | 7 | 8 | 9 | 10 | 12 | 13 | 15 | 17 | 20 | 22 | 25 | 28 | 32 | 36 | 40 | 45 | 50 | 56 |
| $\beta$ 3 | 3 | 3 | 3 | 4 | 4 | 4 | 6 | 6 | 7 | 7 | 8 | 8 | 9 | 9 | 10 | 10 | 11 | 11 |

| Index$_A$ (for $\alpha$) or Index$_B$ (for $\beta$) | | | | | | | | | | | | | | |
|---|---|---|---|---|---|---|---|---|---|---|---|---|---|---|
| 38 | 39 | 40 | 41 | 42 | 43 | 44 | 45 | 46 | 47 | 48 | 49 | 50 | 51 | |
| $\alpha$ 63 | 71 | 80 | 90 | 101 | 113 | 127 | 144 | 162 | 182 | 203 | 226 | 255 | 255 | |
| $\beta$ 12 | 12 | 13 | 13 | 14 | 14 | 15 | 15 | 16 | 16 | 17 | 17 | 18 | 18 | |

Further, the particular values for α and β to be used on each block boundary 47 do not only depend on QP, but additionally upon a pair of parameter values, referred to as Filter_Offset_A and Filter_Offset_B, (referenced 39 in FIG. 2) that are transmitted in the higher-level syntax (sequence 17, picture 19, or preferably the slice level 21) within the video bitstream 15. These offsets 39 are added to the average QP value between the blocks 24 in order to calculate the indices that are used to access the tables of ALPHA (α) and BETA (β) values (114), as well as the C0 table:

$$Index_A = Clip(QP_{min}, QP_{max}, QP_{av} + Filter\_Offset\_A)$$

$$Index_B = Clip(QP_{min}, QP_{max}, QP_{av} + Filter\_Offset\_B)$$

The variables $QP_{min}$ and $QP_{max}$ in the above equations represent the minimum and maximum permitted values, respectively, of the quantization parameter QP, and for example can be such that but not limited to the values 0 and 51, respectively.

However, because the values $Index_B$ and $Index_A$ are limited to lie in a predetermined interval, if any of the computed coefficients lie outside the interval, those values are limited to the permitted range by the "clip" function. The function "clip" is defined as:

Clip(a, b, c)=IF (c<a) THEN a

ELSE IF (c>b) THEN b

ELSE c

By default, Filter_Offset_A and Filter_Offset_B values 39 are both assumed to have a value of zero. Further, within the default filtering, $Index_A$ is also used to access the table of C0 values. Transmission of the Filter_Offset_A and Filter_Offset_B values 39 in the slice header 27 (see FIG. 2) provides a means of adapting the properties of the deblocking filter 44 in terms of the magnitude of the thresholds used in the activity checks and the maximum change in sample values that can be produced by the default filter 44. This flexibility helps to allow the encoder to achieve the optimal visual quality of the decoded and filtered video. Typically, the semantic in the slice header 27 slice_alpha_c0_offset_div2 specifies the offset 39 used in accessing the ALPHA (α) and C0 deblocking filter tables for filtering operations controlled by the macroblocks 24 within the slice 32. The decoded value of this parameter is in the range from +6 to −6, inclusive. From this value, the offset 39 that shall be applied when addressing these tables is computed as:

Filter_Offset_A=slice_alpha_c0_offset_div2<<1

If this value is not present in the slice header 27, then the value of this field shall be inferred to be zero.

Correspondingly, the semantic in the slice header 27 slice_beta_offset_div2 specifies the offset 39 used in accessing the BETA (β) deblocking filter tables for filtering operations controlled by the macroblocks 24 within the slice 32. The decoded value of this parameter is in the range from +6 to −6, inclusive. From this value, the offset 39 that shall be applied when addressing these tables is computed as:

Filter_Offset_B=slice_beta_offset_div2<<1.

If this value 39 is not present in the slice header 27, then the value of this field shall be inferred to be zero. The resulting Variable-Shift Table Indexing (VSTI) method (using the offsets 39 to shift selection of the α-, β-, and clipping (C0) values) allows the decoder 20 to make use of the offset 39 that is specified on the individual slice 32 basis and that will be added to the QP value used in indexing the α-, β-, and clipping (C0) tables. Thus, Alpha (α)=ALPHA_TABLE[$Index_A$]

Beta (β)=BETA_TABLE [$Index_B$]

C0=CLIP_TABLE [Bs][$Index_A$]

The offset 39 for indexing the clipping table is always the same as for the α-table. In general, it is desired have a and the clipping values remain in sync, although a different offset 39 for β can be beneficial. The implementation of this method can be simplified even further by applying the offset 39 to the base pointers that are used to access the tables. This way, the extra addition only occurs as often as the offset 39 can be changed (on a per-slice basis), not every time the table is accessed. Clipping of the index can be avoided by extending the tables with the last value in the valid range of indices at each end of the table.

A positive offset 39 results in more filtering by shifting a curve (of α, β, or C0 values) to the left on a horizontal QP scale, while a negative offset 39 results in less filtering by shifting a curve to the right. The range of permitted offsets 39 is −12 to +12, in increments of 2. This range is large enough to allow properties of the filter 44 to vary as widely, but is limited to limit additional memory requirements and/or added complexity. This variable-shift method provides both stronger and weaker filtering, and there is sufficient flexibility in the range of values, with reasonable constraints on the amount of variation permitted in the filtering, while maintaining the doubling rate of 6 QP's for α, consistent with the quantization step size. Also, the clipping (C0) and α values remain in sync with each other.

The specific decision on the choice of offsets 39 is varied, and dependent upon the content, resolution, and opinion of the viewer. Generally, less filtering is needed for slowly changing, detailed areas and for high-resolution pictures 22, while more filtering (using positive offsets 39) is preferable for lower resolution pictures 22, especially with smooth areas and human faces. More filtering can provide the viewer with a feeling of smoother motion.

Referring again to FIG. 5, if the check is not passed in step 116, the sample values are not modified on this line (118), otherwise filtering continues. The selection of the filtering mode occurs at the block boundary 47 level. More specifically, switching between the default-mode filtering and the strong-mode filtering does not occur on a line-to-line basis, and default-mode filtering is not used for intra-coded macroblock boundaries 47. In step 120, a further determination is made as to whether the macroblocks 24 are intra-coded. If the macroblocks 24 are not intracoded, then a default filter is applied in step 122, in which the edges 47 with Bs<4 are filtered by computing the filtered samples $P_0$ and $Q_0$ based on the DELTA (Δ). The variable Δ represents the difference the between the unfiltered samples $p_0$ and $q_0$ and their respective filtered samples, $P_0$ and $Q_0$, according to the following relation:

$$\Delta = Clip(-C, C, (((q_0 - p_0) << 2 + (p_1 - q_1) + 4) >> 3))$$

$$P_0 = Clip(0, 255, p_0 + \Delta)$$

$$Q_0 = Clip(0, 255, q_0 - \Delta)$$

The two intermediate threshold variables $a_p$ and $a_q$ are used to determine the clipping value for the default filtering of luminance samples, as well as the choice of one of the two sub-modes of the strong mode filter, where $$a_p = |p_2 - p_0| \text{ and } a_q = |q_2 - q_0|.$$

Thus, for default-mode filtering (122), the calculations of filtered samples $P_1$ and $Q_1$ are modified from the prior art to increase the parallelism of the filtering process. If $a_p<\beta$ for a luma edge, a filtered $P_1$ sample generated as specified by:

$$P_1 = p_1 + \text{Clip}(-C0, C0, (p_2+(p_0+q_0)>>1-(p_1<<1))>>1).$$

While if $a_q<\beta$ for a luma edge, a filtered $Q_1$ sample generated as specified by:

$$Q_1 = q_1 + \text{Clip}(-C0, C0, (q_2+(p_0+q_0)>>1-(q_1<<1))$$

where C0 is specified in Table 4. However, the adaptable parameter $\text{Index}_A$ is used to address the table, rather than $QP_{av}$.

Figure 6:
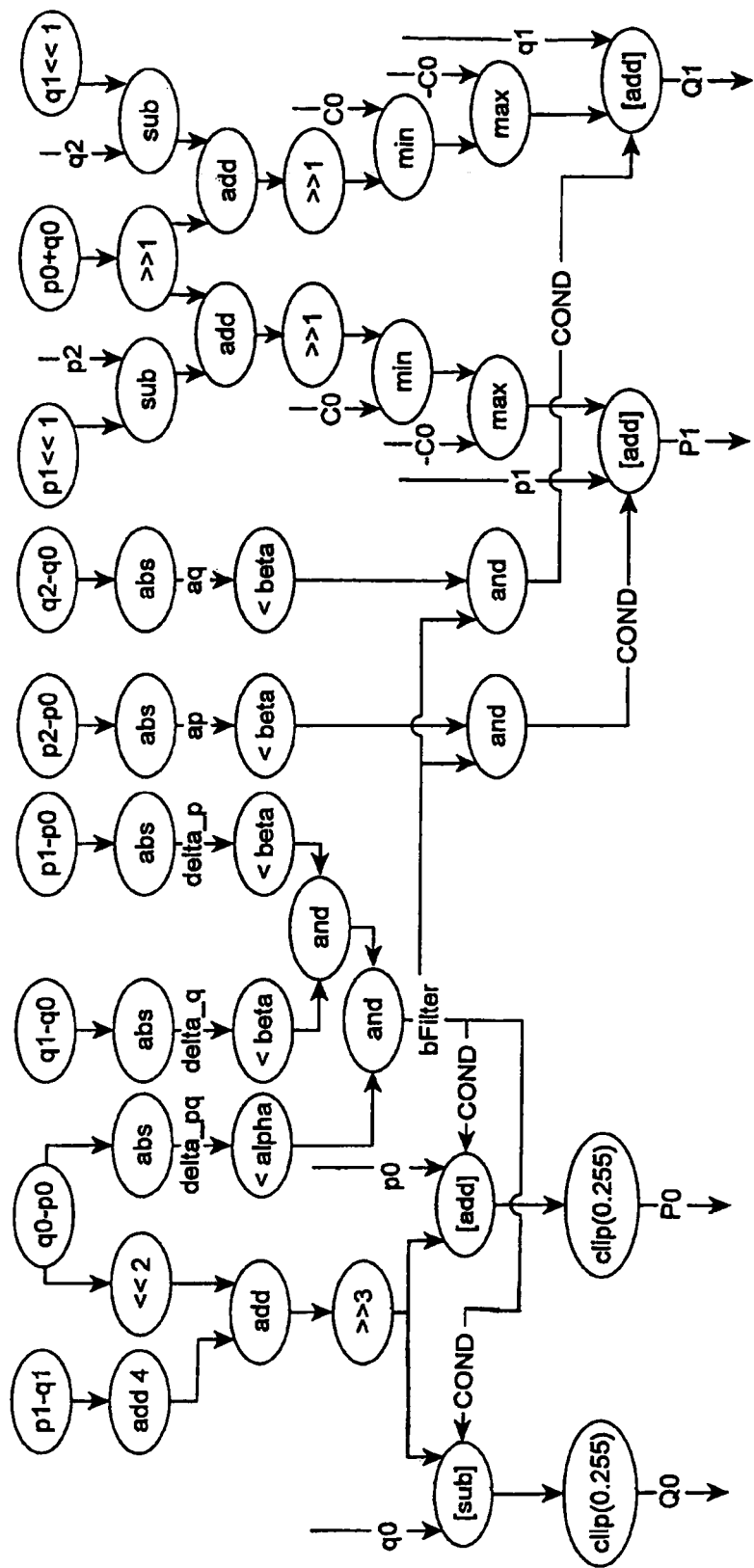
FIG. 6 is the dependency graph for default mode filter for the decoder of FIG. 4.

A dependency graph for the default mode filter with reduced critical path as shown in FIG. 6 shows that the complexity can be reduced significantly. By shortening the critical path, a reduced cost of default filtering can be achieved and opportunities for parallel processing can be substantially increased, leading to reduced computational requirements. Also, from this figure, the complexity of Bs=4 filtering is potentially reduced by not permitting the filter 44 to switch between default and strong filter modes on a line-by-line basis to help minimise branching stalls and control logic.

For luminance only, C, which represents the maximum change in the level of intensity that the default filter can apply to the $p_0$ and $q_0$ samples, is determined by setting it equal to C0 and then incrementing it by one if $a_p<\beta$, and again by one if $a_q<\beta$. In the default luma filtering, $P_1$ and $Q_1$ are filtered only if $a_p<\beta$ and $a_q<\beta$, respectively, evaluate to true, while $P_1$ and $Q_1$ are never filtered for chroma. Therefore, for chrominance filtering, instead of doing these calculations, C can be defined with the basic relationship:

$$C = C0+1$$

Thus, there is a no need to perform the calculations of $a_p$ and $a_q$ for chrominance and therefore no need to load the sample values $p_2$ and $q_2$. This can reduce the complexity of the default chroma filtering by approximately 20%. There is no reduction in quality, either objective or subjective, introduced by this simplification.

For strong mode filtering where Bs=4 and the initial activity threshold check 112 has been passed, a further determination to check whether each side of the boundary 47 meets an additional smoothness criteria is performed in steps 124 and 126. The smoothness criteria for the left/upper side of the boundary 47 is checked in step 124, while the smoothness criteria for the right/lower side is checked in step 126. Thus, a choice between a 3-tap filter or a 5-tap filter for the left/upper (P) or the right/lower (Q) side of the boundary 47 is made. If the smoothness criterion is not met on a particular side, a 3-tap filter is used to filter only a single pixel on that side of the boundary 47.

Specifically, for strong-mode filtering:

$$a_p = |p_2 - p_0|$$

$$a_q = |q_2 - q_0|$$

Therefore, in step 124, for filtering of edges with Bs=4 if the following condition holds true $$a_p < \text{BETA}(\beta) \text{ AND } |p_0-q_0| < ((\text{ALPHA}(\alpha)>>2)+2),$$

then filtering of the left/upper side of the block edge is specified by the equations (130)

$$P_0 = (p_2 + 2*p_1 + 2*p_0 + 2*q_0 + q_1 + 4) >> 3$$

$$P_1 = (p_2 + p_1 + p_0 + q_0 + 2) >> 2$$

In the case of luminance filtering, then (130)

$$P_2 = (2*p_3 + 3*p_2 + p_1 + p_0 + q_0 + 4) >> 3$$

Otherwise, if the above condition does not hold, then filter only P0 using the 3-tap filter (128)

$$P_0 = (2*p_1 + p_0 + q_1 + 2) >> 2$$

Identical but mirrored filters are applied to the right/lower side of the boundary 47, substituting q and Q for p and P, respectively, in the above description (and vice-versa) (132, 134).

Therefore, if the following condition holds true (126):

$$a_p < \text{BETA}(\beta) \text{ AND } |p_0-q_0| < ((\text{ALPHA}(\alpha)>>2)+2)$$

filtering of the right/lower side of the block edge (134) is specified by the equations $$Q_0 = (p_1 + 2*p_0 + 2*q_0 + 2*q_1 + q_2 + 4) >> 3$$

$$Q_1 = (p_0 + q_0 + q_1 + q_2 + 2) >> 2$$

In the case of luminance filtering, then (134)

$$Q_2 = (2*q_3 + 3*q_2 + q_1 + q_0 + p_0 + 4) >> 3$$

Otherwise, if the above condition does not hold, then only P0 is filtered with the 3-tap filter (132)

$$Q_0 = (2*q_1 + q_0 + p_1 + 2) >> 2$$

The system 10 thus includes a set of equations for the strong mode filtering to generate samples $P_1$ and $Q_1$ that can provide a greater reduction in the visibility of blocking artifacts than alternative equations that were used in the

TABLE 4

| | $\text{Index}_A$ | | | | | | | | | | | | | | | | | | | | | | | | | |
|---|---|---|---|---|---|---|---|---|---|---|---|---|---|---|---|---|---|---|---|---|---|---|---|---|---|---|
| | 0 | 1 | 2 | 3 | 4 | 5 | 6 | 7 | 8 | 9 | 10 | 11 | 12 | 13 | 14 | 15 | 16 | 17 | 18 | 19 | 20 | 21 | 22 | 23 | 24 | 25 |
| Bs = 1 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 |
| Bs = 2 | 0 | 0 | 0 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 |
| Bs = 3 | 0 | 0 | 0 | 0 | 0 | 0 | 0 | 0 | 0 | 0 | 0 | 0 | 0 | 0 | 0 | 0 | 0 | 1 | 1 | 1 | 1 | 1 | 1 | 1 | 1 | 1 |

| | $\text{Index}_A$ | | | | | | | | | | | | | | | | | | | | | | | | | |
|---|---|---|---|---|---|---|---|---|---|---|---|---|---|---|---|---|---|---|---|---|---|---|---|---|---|---|
| | 26 | 27 | 28 | 29 | 30 | 31 | 32 | 33 | 34 | 35 | 36 | 37 | 38 | 39 | 40 | 41 | 42 | 43 | 44 | 45 | 46 | 47 | 48 | 49 | 50 | 51 |
| Bs = 1 | 1 | 1 | 1 | 1 | 1 | 1 | 1 | 2 | 2 | 2 | 3 | 3 | 3 | 4 | 4 | 4 | 5 | 6 | 6 | 7 | 8 | 9 | 10 | 11 | 13 |
| Bs = 2 | 1 | 1 | 1 | 1 | 1 | 2 | 2 | 2 | 2 | 3 | 3 | 3 | 4 | 4 | 5 | 5 | 6 | 7 | 8 | 8 | 10 | 11 | 12 | 13 | 15 | 17 |
| Bs = 3 | 1 | 2 | 2 | 2 | 2 | 3 | 3 | 3 | 4 | 4 | 4 | 5 | 6 | 6 | 7 | 8 | 9 | 10 | 11 | 13 | 14 | 16 | 18 | 20 | 23 | 25 | prior known method Typically, the filters for samples $P_1$ and $Q_1$ consist of only 4 taps, as opposed to the 5 taps used for the other filtered samples in this strongest filtering mode. However, this is referred to as a 5-tap filter, since 5 taps is the maximum used for any sample. In addition to providing an improved reduction in blocking artifacts, these equations for filtering $P_1$ and $Q_1$ are simpler than those used in the prior art method, potentially reducing the complexity of the filter by a small amount.

The system 10 includes tables for ALPHA ($\alpha$) and BETA ($\beta$) that can improve the subjective quality of the filtered video and can also specify an efficient method to allow the encoder 18 to control the characteristics of the deblocking filter 44 by transmitting variable offsets 39 that affect the QP-based indexing of these tables.

Although the invention has been described with reference to certain specific embodiments, various modifications thereof will be apparent to those skilled in the art without departing from the spirit and scope of the invention as outlined in the claims appended hereto

The invention claimed is:

1. A method of filtering reconstructed samples to minimise coding artifacts introduced at a block boundary in a block-based video encoder and/or decoder, the method having the steps of:
   (a) calculating a pair of indices used to access a table of a pair of corresponding activity threshold values, the indices calculated using an average quantization parameter and an offset parameter;
   (b) determining the activity threshold values based on the pair of indicies;
   (c) confirming whether the filtering process will modify the sample values on every line of samples for the block boundary by checking a content activity for the every line of samples for said block boundary, the content activity based on the determined activity threshold values; and
   (d) filtering the confirmed samples when the filtering strength, Bs, is not equal to zero wherein a pair of the activity threshold values are ALPHA ($\alpha$) and BETA ($\beta$), and the average quantization parameter, $QP_{av}$, was used in coding the two blocks that neighbour the block boundary, and the values of the activity threshold values, ALPHA($\alpha$) and BETA ($\beta$) for each possible value of the indices $Index_A$ and $Index_B$ are

| $Index_A$ (for $\alpha$) or $Index_B$ (for $\beta$) | | | | | | | | |
|---|---|---|---|---|---|---|---|---|
| 0 | 1 | 2 | 3 | 4 | 5 | 6 | 7 | 8 |
| $\alpha$ 0 | 0 | 0 | 0 | 0 | 0 | 0 | 0 | 0 |
| $\beta$ 0 | 0 | 0 | 0 | 0 | 0 | 0 | 0 | 0 |

| $Index_A$ (for $\alpha$) or $Index_B$ (for $\beta$) | | | | | | | | |
|---|---|---|---|---|---|---|---|---|
| 9 | 10 | 11 | 12 | 13 | 14 | 15 | 16 | 17 |
| $\alpha$ 0 | 0 | 0 | 0 | 0 | 0 | 0 | 4 | 4 |
| $\beta$ 0 | 0 | 0 | 0 | 0 | 0 | 0 | 2 | 2 |

| $Index_A$ (for $\alpha$) or $Index_B$ (for $\beta$) | | | | | | | | |
|---|---|---|---|---|---|---|---|---|
| 18 | 19 | 20 | 21 | 22 | 23 | 24 | 25 | 26 |
| $\alpha$ 5 | 6 | 7 | 8 | 9 | 10 | 12 | 13 | 15 |
| $\beta$ 2 | 3 | 3 | 3 | 3 | 4 | 4 | 4 | 6 |

| $Index_A$ (for $\alpha$) or $Index_B$ (for $\beta$) | | | | | | | | |
|---|---|---|---|---|---|---|---|---|
| 27 | 28 | 29 | 30 | 31 | 32 | 33 | 34 | 35 |
| $\alpha$ 17 | 20 | 22 | 25 | 28 | 32 | 36 | 40 | 45 |
| $\beta$ 6 | 7 | 7 | 8 | 8 | 9 | 9 | 10 | 10 |

| $Index_A$ (for $\alpha$) or $Index_B$ (for $\beta$) | | | | | | | | |
|---|---|---|---|---|---|---|---|---|
| 36 | 37 | 38 | 39 | 40 | 41 | 42 | 43 | 44 |
| $\alpha$ 50 | 56 | 63 | 71 | 80 | 90 | 101 | 113 | 127 |
| $\beta$ 11 | 11 | 12 | 12 | 13 | 13 | 14 | 14 | 15 |

| $Index_A$ (for $\alpha$) or $Index_B$ (for $\beta$) | | | | | | |
|---|---|---|---|---|---|---|
| 45 | 46 | 47 | 48 | 49 | 50 | 51 |
| $\alpha$ 144 | 162 | 182 | 203 | 226 | 255 | 255 |
| $\beta$ 15 | 16 | 16 | 17 | 17 | 18 | 18. |

2. A method of filtering reconstructed samples to minimise coding artifacts introduced at a block boundary in a block-based video encoder and/or decoder, the method having the steps of:
   (a) calculating a pair of indices used to access a table of a pair of corresponding activity threshold values, the indices calculated using an average quantization parameter and an offset parameter;
   (b) determining the activity threshold values based on the pair of indicies;
   (c) confirming whether the filtering process will modify the sample values on every line of samples for the block boundary by checking a content activity for the every line of samples for said block boundary, the content activity based on the determined activity threshold values; and
   (d) filtering the confirmed samples when a block on either side of the block boundary was coded using inter prediction,
   wherein the following equations are used to compute the filtered sample values at a second position from the block boundary on either side, denoted $P_1$ and $Q_1$, for a luminance component:

$$P_1=p_1+\text{Clip}(-C0, C0, (p_2+(p0+q0)>>1-(p_1<<1))>>1)$$

$$Q_1=q_1+\text{Clip}(-C0, C0, (q_2+(p_0+q_0)>>1-(q_1<<1))>>1).$$

3. The method of claim 2, wherein the maximum change in the value of the samples that neighbour the block boundary, $p_0$ and $q_0$, due to the filtering process for chrominance components is computed as $$C=C0+1.$$

4. A method of filtering reconstructed samples to minimise coding artifacts introduced at a block boundary in a block-based video encoder and/or decoder, the method having the steps of:
   (a) calculating a pair of indices used to access a table of a pair of corresponding activity threshold values, the indices calculated using an average quantization parameter and an offset parameter;
   (b) determining the activity threshold values based on the pair of indicies;
   (c) confirming whether the filtering process will modify the sample values on every line of samples for the block boundary by checking a content activity for the every line of samples for said block boundary, the content activity based on the determined activity threshold values; and (d) filtering the confirmed samples when a block on either side of the block boundary was coded using inter prediction, wherein a pair of the activity threshold values are ALPHA ($\alpha$) and BETA ($\beta$), and the average quantization parameter, $QP_{av}$, was used in coding the two blocks that neighbour the block boundary, and a pair of the offset parameter is added to the average QP value, $QP_{av}$, in order to compute the indices that are used to address the tables of ALPHA ($\alpha$) and BETA ($\beta$) activity threshold values, such that $Index_A = Clip(QP_{min}, QP_{max}, QP_{av}+Filter\_Offset\_A)$ $Index_B = Clip(QP_{min}, QP_{max}, QP_{av}+Filter\_Offset\_B)$.

5. A method of filtering according to claim 2, wherein the value of the C0 parameter used for clipping the change in the sample values is computed using a value of $Index_A$ of the indicies to address the table of C0 values.

6. A method of controlling filter properties to adjust the properties of said filter at a block boundary, said method having the steps of:

(a) computing an average quantization parameter value ($QP_{av}$) at said block boundary;

(b) adding offset values Filter_Offset_A and Filter_Offset_B to the average quantization parameter value $QP_{av}$ and clipping these values within a given range to determine table indices $Index_A$ and $Index_B$; and (c) accessing an ALPHA ($\alpha$) table, a BETA ($\beta$) table, and a Clipping (C0) table using the indices computed based on the filter offsets and the average quantization parameter value such that:

ALPHA = ALPHA_TABLE[$Index_A$]

BETA = BETA_TABLE [$Index_B$]

C0 = CLIP_TABLE[Bs][$Index_A$].

* * * * *